United States Patent
Black et al.

(10) Patent No.: US 12,099,996 B2
(45) Date of Patent: Sep. 24, 2024

(54) VERIFYING TRANSACTION ADDRESS IS WHITELISTED BEFORE ALLOWING TRANSFER TO TRANSACTION ADDRESS OF SELF-REGULATING TOKEN REQUIRING WHITELISTED TRANSACTION ADDRESS TO WITHDRAW SELF-REGULATING TOKEN

(71) Applicant: tZERO IP, LLC, Salt Lake City, UT (US)

(72) Inventors: Tron Black, Sandy, UT (US); Andrew Warner, Midvale, UT (US)

(73) Assignee: tZERO IP, LLC, Salt Lake City, UT (US)

( * ) Notice: Subject to any disclaimer, the term of this patent is extended or adjusted under 35 U.S.C. 154(b) by 444 days.

(21) Appl. No.: 16/536,701

(22) Filed: Aug. 9, 2019

(65) Prior Publication Data
US 2020/0051072 A1 Feb. 13, 2020

Related U.S. Application Data

(60) Provisional application No. 62/716,871, filed on Aug. 9, 2018.

(51) Int. Cl.
*G06Q 20/36* (2012.01)
*G06Q 40/04* (2012.01)
(Continued)

(52) U.S. Cl.
CPC ..... *G06Q 20/3678* (2013.01); *G06Q 20/3674* (2013.01); *G06Q 40/04* (2013.01); *H04L 9/0637* (2013.01); *H04L 63/0236* (2013.01)

(58) Field of Classification Search
CPC ............ G06Q 20/00–425; H04L 9/00–50
See application file for complete search history.

(56) References Cited

U.S. PATENT DOCUMENTS

2005/0216394 A1 9/2005 Monteleone et al.
2015/0356523 A1 12/2015 Madden
(Continued)

FOREIGN PATENT DOCUMENTS

JP 2018521437 A 8/2018
WO 2017027900 A1 2/2017
WO WO-2018060951 A1 * 4/2018

OTHER PUBLICATIONS

International Searching Authority, "International Search Report and Written Opinion from PCT Application No. PCT/US2019/045898", from Foreign Counterpart to U.S. Appl. No. 16/536,701, filed Dec. 11, 2019, pp. 1-11, Published: WO.
(Continued)

*Primary Examiner* — Ari Shahabi
(74) *Attorney, Agent, or Firm* — Fogg & Powers LLC

(57) ABSTRACT

In an example, a system comprises at least one processor, at least one memory communicatively coupled to the processor, and at least one network interface communicatively coupled to the processor. The processor is configured to: receive an intent to purchase a token into a transaction address from a remote computing device; receive signed data, signed by a private key, from the computing device; receive at least one of the transaction address or public key associated with the transaction address from the computing device; verify that the transaction address or the public key is associated with the private key; verify that the transaction address or the public key is whitelisted to purchase the token; and allow purchase of the token into the transaction address when the target transaction address or the public key is both: (1) associated with the private key and (2) whitelisted to purchase the token.

7 Claims, 5 Drawing Sheets

(51) Int. Cl.
*H04L 9/06* (2006.01)
*H04L 9/40* (2022.01)

(56) References Cited

U.S. PATENT DOCUMENTS

| 2017/0132619 | A1 | 5/2017 | Miller et al. | |
|---|---|---|---|---|
| 2019/0114706 | A1* | 4/2019 | Bell | H04L 9/3239 |
| 2022/0103378 | A1* | 3/2022 | Unger | H04L 9/0637 |

OTHER PUBLICATIONS

Alderstein, "Are Smart Contracts Smart? A Critical Look at Basic Bockchain Questions", Jun. 26, 2017, pp. 1-5, www.coindesk.com/when-is-a-smart-contract-actually-a-contract, retrieved Oct. 31, 2019.
Aventus Network, "Token Sale: White List and other Updates", Aug. 24, 2017, pp. 1-3, Aventus Network, https://blog.aventus.io/token-sale-white-list-and-other-updates-9f85ceda397, retrieved Oct. 31, 2019.
Aziz, "Beginner's Guide to ICO Investing: How to Participate in ICOs", at least as early as May 15, 2018, pp. 1-9, www.masterthecrypto.com/guide-to-ico-investing/, retrieved Oct. 31, 2019.
Baranov, "Add address to white list", Feb. 2, 2018, pp. 1-6, GitHub, https://github.com/poanetwork/token-wizard/wiki/Add-address-to-white-list, retrieved Oct. 31, 2019.
Bitcoin PR Buzz, "Introducing One-of-a-Kind 'Regulation Aware Protocol' for Tokenized Securities by Orderbook", Mar. 13, 2018, pp. 1-5, www.coinidol.com/regulation-aware-protocol-by-orderbook/, retrieved Oct. 31, 2019.
Castonguay, "Off-Chain Whitelist with On-Chain Verification for Ethereum Smart Contracts", Mar. 7, 2018, pp. 1-6, https://medium.com/@PhABC/off-chain-whitelist-with-on-chain-verification-for-ethereum-smart-contracts-1563ca4b8f11, retrieved Oct. 31, 2019.
Commerceblock, "Token Sale Guide", Nov. 27, 2017, pp. 1-8, CommerceBlock, https://blog.commerceblock.com/token-sale-guide-7a69dec4a4d5, retrieved Oct. 31, 2019.
Commerceblock, "Whitelisting—AML & KYC", Oct. 25, 2017, pp. 1-7, CommerceBlock, https://blog.commerceblock.com/whitelisting-aml-kyc-bd945ca40d6c, retrieved Oct. 31, 2019.
Del Castillo, "Smart Contract Issues Set Off 'Alarm Bells', Says US Regulator", Dec. 9, 2016, pp. 1-4, CoinDesk, https://www.coindesk.com/us-regulators-discuss-difficulties-of-smart-contract-oversight, retrieved Oct. 31, 2019.
E-CFR, "Definitions and terms used in Regulation D", 17 C.F.R. 230.501, Commodity and Securities Exchanges, General Rules and Regulations, Securities Action of 1933, Oct. 29, 2019, pp. 1-3, Code of Federal Regulations, https://www.ecfr.gov/cgi-bin/retrieveECFR?gp=&SID=8edfd12967d69c024485029d968ee737&r=SECTION&n=17y3.0.1.1.12.0.46.176, retrieved Oct. 31, 2019.
Ethereum, "How to whitelist up to 50k addresses in a single contract?", Aug. 8, 2017, pp. 1-3, Ethereum Stack Exchange, https://ethereum.stackexchange.com/questions/23945/how-to-whitelist-up-to-50k-addresses-in-a-single-contract, retrieved Oct. 31, 2019.
Horev, "Securing your token sale's whitelist", Nov. 13, 2017, pp. 1-3, https://medium.com/snip-news/securing-your-token-sales-whitelist-bd7ff3800a03, retrieved Oct. 31, 2019.
ICO Insider, "What is ICO? A Beginner's Guide for ICO Participation", ICO Insider, Jan. 30, 2018, pp. 1-9, retrieved Oct. 31, 2019, https://web.archive.org/web/20180130010948/https://icoinsider.tech/what-is-ico/.
ICO, "Interacting with deployed smart contracts", ICO smart contracts 0.1 documentation, at least as early as May 15, 2018, pp. 1-18, https://ico.readthedocs.io/en/latest/interact.html, retrieved Oct. 31, 2019.
Izqui, "Implement token whitelist for token transactions #72", aragon/aragonOS, Jul. 27, 2017, pp. 1-4, GitHub, https://github.com/aragon/aragonOS/issues/72, retrieved Oct. 31, 2019.
Kenton, "Regulation D (Reg D)", Laws and Regulations > Sec & Regulatory Bodies, Mar. 28, 2019, pp. 1-5, Investopedia, https://www.investopedia.com/terms/r/regulationd.asp, retrieved Oct. 31, 2019.
Orderbook, "Orderbook Announces One-of-a-Kind 'Regulation Aware Protocol' for Tokenized Securities", Mar. 7, 2018, pp. 1-4, www.livebitcoinnews.com, retrieved Oct. 31, 2019.
U/Yougetmyattention, "Many whitelisted people's addresses were rejected by the smart contract", at least as early as May 15, 2018, pp. 1-2, Reddit, https://www.reddit.com/r/GIFTO/comments/7jz97n/many_whitelisted_peoples_adresses_were_rejected/, retrieved Oct. 31, 2019.
Wallet, "How to contribute to Dether's token sale? (Using MyEtherWallet or Metamask)", Feb. 4, 2018, pp. 1-12, https://medium.com/dether/how-to-participate-in-the-dether-token-sale-6e518830fcbe, retrieved Oct. 31, 2019.
Wikipedia, "Ethereum", pp. 1-12, Wikipedia, https://en.wikipedia.org/wiki/Ethereum, retrieved Oct. 31, 2019.
William, "ERC-20 Tokens, Explained", May 12, 2018, pp. 1-13, Cointelegraph, https://cointelegraph.com/explained/erc-20-tokens-explained, retrieved Oct. 31, 2019.
Antonopoulos, et al., "Mastering Ethereum", Mastering Ethereum: Building Smart Contracts and DApps, at least as early as Dec. 2018, Retrieved from the Internet on Jan. 18, 2022: URL:https://dl.ebooksworld.ir/motoman/Mastering_Ethereum_Andreas.M.Antonopoulos.www.EbooksWorld.ir.pdf, pp. v through 368.
BCD, "BCDiploma WhtePaper v2.2", Apr. 20, 2018, Retrieved from the Internet on Mar. 25, 2021, URL:https://www.evidenz.io/img/pdf/BCD-WhitePaper_last.pdf, pp. 1 through 35.
European Patent Office, "Extended European Search Report from EP Application No. 19848521.1", from Foreign Counterpart to U.S. Appl. No. 16/536,701, filed Apr. 4, 2022, pp. 1 through 12, Published: EP.
Intellectual Property Office of Singapore, "Invitation to Respond to Written Opinion", from SG Application No. 11202100787U, Jan. 2, 2023 from Foreign Counterpart to U.S. Appl. No. 16/536,701, pp. 1 through 10, Published: SG.
Japanese Patent Office, "Notice of Reason for Rejection", from JP Application No. 2021-506754, From Foreign Counterpart to U.S. Appl. No. 16/536,701, filed Aug. 15, 2023, pp. 1 through 4, Published: JP.
Korean Intellectual Property Office, "Notification of Preliminary Rejection", dated Mar. 14, 2024, from KR Application 10-2021-7006887, from Foreign Counterpart to U.S. Appl. No. 16/536,701, pp. 1 through 10, Published: KR.
European Patent Office, "Communication pursuant to Article 94(3)", dated Jun. 10, 2024, from EP application 19848521.1, from Foreign Counterpart to U.S. Appl. No. 16/536,701, pp. 1-10, Published: EP.
Intellectual Property Office of Singapore, "Invitation to Respond to Written Opinion and the Written Opinion", dated May 21, 2024, from SG applicatin No. 11202100787U from Foreign Counterpart to U.S. Appl. No. 16/536,701, pp. 1-8, Published: SG.

* cited by examiner

VERIFYING TRANSACTION ADDRESS IS
WHITELISTED BEFORE ALLOWING
TRANSFER TO TRANSACTION ADDRESS
OF SELF-REGULATING TOKEN
REQUIRING WHITELISTED TRANSACTION
ADDRESS TO WITHDRAW
SELF-REGULATING TOKEN

CROSS-REFERENCE TO RELATED
APPLICATIONS

This application claims the benefit of U.S. Provisional Patent Application Ser. No. 62/716,871, filed on Aug. 9, 2018, entitled "VERIFYING TRANSACTION ADDRESS IS WHITELISTED BEFORE ALLOWING TRANSFER TO TRANSACTION ADDRESS OF SELF-REGULATING TOKEN REQUIRING WHITELISTED TRANSACTION ADDRESS TO WITHDRAW SELF-REGULATING TOKEN," which is hereby incorporated herein by reference.

BACKGROUND

Currently, cryptographic tokens are used for many purposes in connection with various aspects of different blockchains. For example, smart contracts implemented on the Ethereum blockchain enable the creation and issuance of tokens with complex behaviors attached to them. Ethereum Request for Comment 20 (ERC20) is a technical standard used for smart contracts on the Ethereum blockchain for implementing tokens, and is incorporated herein by reference.

SUMMARY

In an aspect, a system comprises at least one processor, at least one memory communicatively coupled to the at least one processor, and at least one network interface communicatively coupled to the at least one processor. The at least one processor is configured to: receive an intent to purchase a token into a target transaction address from a remotely located computing device. The at least one processor is further configured to receive signed data from the remotely located computing device, the signed data signed by a private key. The at least one processor is further configured to receive at least one of the target transaction address or a target public key associated with the target transaction address from the remotely located computing device. The at least one processor is further configured to verify that the at least one of the target transaction address or the target public key associated with the target transaction address is associated with the private key. The at least one processor is further configured to verify that the at least one of the target transaction address or the target public key associated with the target transaction address is whitelisted to purchase the token. The at least one processor is further configured to allow purchase of the token into the target transaction address when the at least one of the target transaction address or the target public key associated with the target transaction address is both: (1) associated with the private key and (2) whitelisted to purchase the token.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
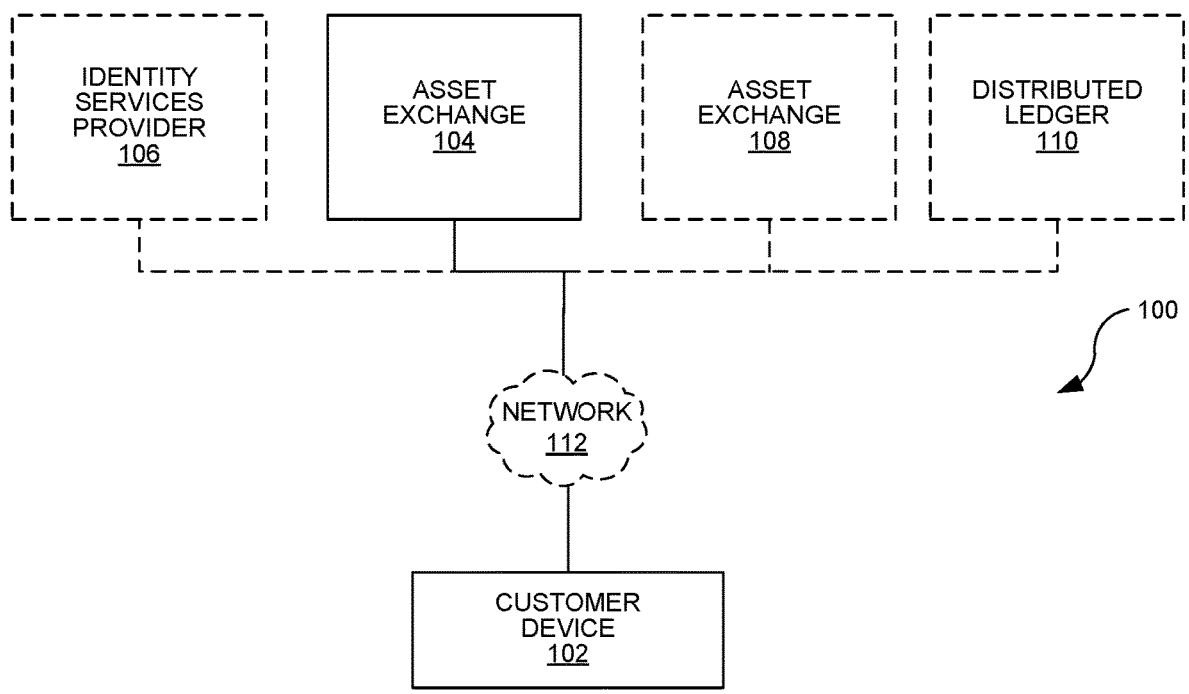
FIG. 1 is a block diagram of an example system for verifying that a transaction address is whitelisted according to the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Under United States federal securities laws, a company (issuer) that offers or sells securities generally must register the securities with the Securities and Exchange Commission (SEC) by complying with certain registration requirements of the Securities Act. However, offerings or sales of securities can be exempted from the registration requirements if the issuer complies with particular regulations. Regulation D and Regulation S are examples of rules that, if complied with, lead to an exemption from the registration requirements. For some exemptions, such as Rule 506 of Regulation D, a company may sell securities to an individual referred to as an accredited investor, which is defined in Rule 501 of Regulation D. There are also other exceptions under other parts of Regulation D, Regulation S, Regulation A, etc. As used herein, Regulation A refers to any of Rules 251-263 of Regulation A (as found in 17 C.F.R. § 230.251-230.263); Regulation D refers to any of Rules 501-506 of Regulation D (as found in 17 C.F.R. § 230.501-230.506); and Regulation S refers to any of Rules 901-905 of Regulation S (as found in 17 C.F.R. § 230.901-230.905).

Cryptographic tokens, such as those associated with ERC20, are popular for initial coin offerings (ICOs) and other uses. Recently, the SEC has determined that cryptographic tokens may be considered securities based on individual circumstances. To avoid application of securities laws, many ICOs are restricted to users that are outside the United States and other territories with strict securities regulation. However, this restriction limits the pool of investors and/or users that may purchase tokens. For some companies, it may be desirable to offer or sell tokens in the US and other territories with strict securities regulation. To avoid the high cost of registering securities with the SEC or other securities regulation organizations, it may also be desirable to comply with rules necessary for an exemption to the registration requirements.

For token contracts, the smart contract for a token can include commands to implement various rules to comply with securities regulations. For example, a smart contract for a token includes commands to add compliance measures for SEC Regulation A, Regulation D, and/or Regulation S. In some examples, these compliance measures include verifying that specific customers meet the requirements for purchase of a regulated token and adding the public key or transaction address for the customers to a whitelist. In some examples, a whitelist for a regulated token sale purchasers can be limited to individuals that qualify as accredited investors under Rule 501 of Regulation D. In some examples, the whitelist is a separate smart contract from the token contract and the whitelist includes a list of the whitelisted public keys or transaction addresses. By ensuring that all purchasers of tokens are whitelisted, the issuer of the token complies with the rules of Regulation A, Regulation D, Regulation S, and/or other securities laws and avoids the registration requirements.

However, if a token contract implements the whitelisting functionality as described above, it is possible that a subsequent purchaser of the token who is not on the whitelist will be unable to withdraw the token. In particular, it is possible that a subsequent purchaser of the token will not have a public key or transaction address on the whitelist that is being implemented by the token. This would result in the subsequent purchaser not being able to withdraw the token, e.g. exchange for currency, property, services, etc. It is desirable to prevent the above scenario so a customer does not inadvertently purchase tokens when the customer cannot withdraw them.

To address the above problem, the examples described herein implement validation/verification of a particular transaction address being on the whitelist before allowing a transaction of the token to occur. In one example, the verification can be implemented by an asset exchange (such as, for example, asset exchange 104). The verification includes requiring a potential purchaser of the regulated tokens (that require the user to be whitelisted) to send signed data to a system, where the data is signed with a private key corresponding to the particular transaction address the potential purchaser wants to transact into. The asset exchange verifies that the data was signed with the private key that corresponds to the transaction address the user indicated was the intended destination for the regulated token and that the transaction address is on the appropriate whitelist. In some examples, the asset exchange could verify that the data was signed with the private key that corresponds to a public key associated with the transaction address. The asset exchange allows the transfer to proceed when the private key corresponds to the target transaction address or target public key and the target transaction address or the target public key is on the whitelist. If these conditions are not met, the asset exchange rejects or otherwise denies the transfer.

FIG. 1 is a block diagram of an example system 100 for implementing transactions with regulated tokens. The system 100 includes a customer device 102, asset exchange 104, an optional identity services provider 106, an optional second asset exchange 108, and an optional distributed ledger 110. Additionally, the system 100 may include more than one of each device.

Each of the customer device 102, the asset exchanges 104, 108, and the identity services provider 106 may be implemented as any of a mobile computing system, such as a mobile phone, tablet computer, mobile media device, mobile gaming device, laptop computer, or vehicle-based computer, etc.; or a non-mobile computing device such as a dedicated terminal, public terminal, a kiosk, a server, a cloud server, or a desktop computer.

In some examples, each of the customer device 102 and the asset exchange 104 may include at least one memory, at least one processor, at least one optional network interface, at least one optional display device, at least one optional input device, and at least one optional power source. Additionally, each of the customer device 102 and the asset exchanges 104, 108 may be implemented using multiple physical devices.

As used herein, unless otherwise specified, the term "customer" (or "user") refers to a person (or automated instructions, e.g., a script) that accesses the customer device 102 to initiate any of the functionality described herein, e.g., sending an intent to purchase the token, executing etc.

As used herein, the term "wallet" refers to a software program, digital file, and/or memory used to store and/or manage digital assets, such as cryptocurrency. Although the present systems and methods are described herein using cryptocurrency, they are also compatible with any type of digital asset. In some examples, a wallet may be defined by one or more private keys, one or more public keys derived from one or more private keys, and/or one or more transaction addresses derived from one or more private keys and/or one or more public keys. In some examples, a wallet may be defined by one or more private account keys (and optional corresponding public account key(s)), each of which may have one or more child and/or grandchild transaction keys.

As used herein, the term "distributed ledger" refers to an electronic ledger that is distributed across multiple interconnected nodes, where more than one of the nodes stores a copy of the ledger. In some examples, the distributed ledger 110 may implement one or more blockchains to validate the data stored within the distributed ledger 110. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger 110. Exemplary blockchains include, but are not limited to, the bitcoin blockchain, the Ethereum blockchain, BigchainDB, Billon, Chain, Corda, Credits, Elements, Monax, Fabric, HydraChain, Hyperledger, Multichain, Openchain, Quorum, Sawtooth, and Stellar.

In some examples, the customer device 102 may be a mobile device, e.g., using the Android® or iOS® operating systems. A customer may download, to the customer device 102, an application corresponding to the asset exchange 104. The application may present a user interface on the customer device 102, and the customer may provide input using the user interface. Based at least in part on the user input, the application on the customer device 102 may send and receive instructions and/or other data to the asset exchange 104. In some examples, the application on the customer device 102 may only communicate directly with the asset exchange 104, which communicates with other devices in the system 100, i.e., the asset exchange 104 may be a gateway to other devices in the system 100. Alternatively, the application on the customer device 102 may communicate directly with the asset exchange 104 and/or other devices in the system 100.

In some examples, the asset exchange 104 may assist end-users (i.e., customers) in purchasing and/or exchanging tokens (e.g. self-regulating tokens). In some examples, a token represents at least one of a security, a currency (e.g. a fiat currency or cryptocurrency), a commodity, a bond, a fund, or a combination thereof. In some examples, tokens represent other types of assets such as at least one piece of real property or personal property. Additionally, the asset exchange 104 enables customers to purchase self-regulating tokens using other forms of currency, e.g., fiat currency, cryptocurrency (e.g., Bitcoin or Ethereum), etc. In some examples, the asset exchange 104 may also enable customers to transact using self-regulating tokens, i.e., buy and/or sell goods and/or services in exchange for the tokens. In order to enable the purchase of cryptocurrency and transactions using cryptocurrency, the asset exchange may be a marketplace (and/or a business entity that operates the marketplace) in which securities, commodities, derivatives and/or other financial instruments are traded, e.g., Kraken, SFOX, Coinbase®, etc. In some examples, the asset exchange 104 may serve as a marketplace for cryptocurrency, digital currency, fiat currency, and/or commodity currency. In some examples, the asset exchange 104 described herein may record successfully executed transactions on a distributed ledger 110, e.g., a blockchain. Alternatively, or in addition to, the asset exchange 104 may be configured to trade at least one security, at least one bond, at least one commodity, at least one piece of real property, at least one item of personal property, at least one fund, at least one currency fund, at least one exchange traded fund, at least one mutual fund, at least one index fund, at least one bond fund, at least one commodity fund, or at least one real estate fund. The asset exchange 104 may be implemented using one or more computing devices.

Each of the devices in the system 100 may be communicatively coupled to one or more other devices using at least one network 112. In some examples, the at least one network 112 includes at least one wired network and/or at least one wireless network. In some examples, any combination of wired and wireless networks may be used to couple the customer device 102 and the asset exchange 104 to each other. In some examples, the at least one network 112 includes at least one of at least one local area network (LAN), at least one wide area network (WAN), or the Internet. In some examples, any combination of local area networks, wide area networks, or the Internet may be used as the at least one network 112 to couple the customer device 102 and the asset exchange 104 to each other.

Figure 2:
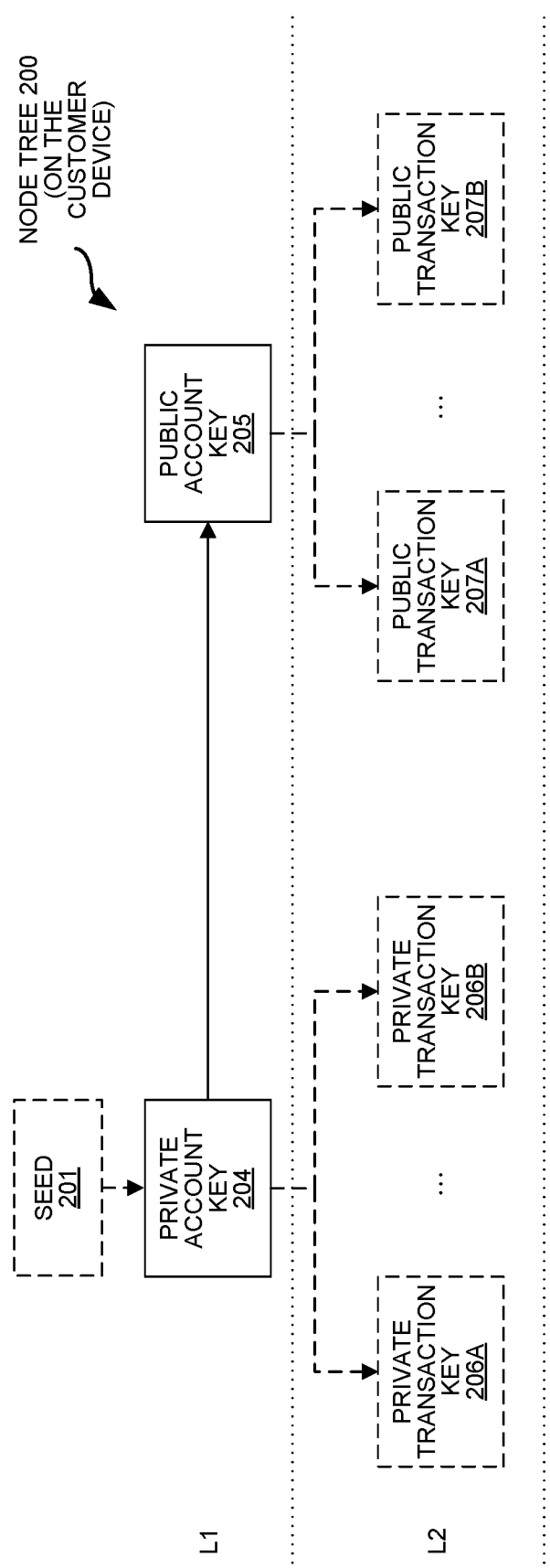
FIG. 2 is a block diagram illustrating an example node tree on a customer device for implementing a token transaction according to the present disclosure.

FIG. 2 is a block diagram illustrating an example node tree 200 on the customer device 102 for implementing a customer wallet used for a token transaction. In some examples, the node tree 200 may implement a hierarchical deterministic (HD) wallets for a customer according to portions of Bitcoin Improvement Proposal 32 (BIP32) and/or portions of Bitcoin Improvement Proposal 44 (BIP44). BIP32 (available at https://github.com/bitcoin/bips/blob/master/bip-0032.mediawiki) and BIP44 (available at https://github.com/bitcoin/bips/blob/master/bip-0044.mediawiki) are incorporated by reference herein.

The node tree 200 may reside on the customer device 102 and may include a hierarchy of levels. Specifically, the node tree 200 may include a private account key 204 and a public account key 205 in the first level (L1). The private account key 204 may be a unique string of numbers, letters, and/or other characters that is specific to a customer. The private account key 204 may further be specific to a type of cryptocurrency. For example, the customer device 102 may include a different private account key 204 for each type of cryptocurrency stored in a customer wallet. In some examples, the customer device 102 may store a separate private account key 204 for each of Bitcoin, Ethereum, Litecoin, etc. A customer wallet may be defined by the private account key 204 and/or other private account key(s) (not shown).

Optionally, the private account key 204 may be generated at the customer device 102 based on a seed 201, e.g., a seed that is derived from a mnemonic code or sentence according to Bitcoin Improvement Proposal 39 (BIP39) (available at https://github.com/bitcoin/bips/blob/master/bip-0039.mediawiki and incorporated by reference herein). Alternatively, the private account key 204 may be generated at the customer device 102 randomly, manually, or by other means.

The private account key 204 may be used to derive a public account key 205, i.e., the private account key 204 may be determinative of the public account key 205. In some examples, the customer device 102 may use a hash function to derive the public account key 205 from the private account key 204, e.g., the SHA256 function. However, the public account key 205 is typically (and preferably) not determinative of the private account key 204, e.g., the public account key 205 may not be used to generate the private account key 204.

The private account key 204 and the public account key 205 may be "extended" keys, meaning that a chain code is appended to the key string. In some examples, each of the private account key 204 and the public account key 205 may be 256 bits long with an additional 256-bit chain code, i.e., the extended private account key 204 and the extended public account key 205 may each be 512 bits long. An extended key may be used to derive child keys, while a non-extended (or "hardened") key may not be used to derive child keys. Since they are extended keys, it may be preferable to avoid transmitting the private account key 204 and the public account key 205 from the customer device 102 to the asset exchange 104.

The private account key 204 may have one or more optional child private transaction keys 206A-B in the second level (L2) of the node tree 200. The private transaction key(s) 206 may be derived from the private account key 204 using a child key derivation (CKD) function, e.g., as described in BIP32. The private transaction key(s) 206 may be non-extended (i.e., hardened) keys and may not be used to derive further child keys.

Each private transaction key 206 may have an associated index, e.g., in the range of 0 to $(2^{32}-1)$. The index may be used to navigate the node tree 200, i.e., an index may uniquely identify the location of its corresponding particular private transaction key 206. Accordingly, indices may be transmitted between devices as an efficient way to identify a private transaction key 206. In some examples, a device that receives an index may generate a corresponding private transaction key 206 from its own node tree.

Similarly, the public account key 205 may have one or more optional public transaction keys 207A-B in the second level (L2) of the node tree 200. Each public transaction key 207 may be derived from a public account key 205 using a child key derivation (CKD) function (e.g., as described in BIP32) or derived from an associated private transaction key 206, i.e., public transaction key 207A may be derived from private transaction key 206A and public transaction key 207B may be derived from private transaction key 206B. The public transaction key(s) 207 may be non-extended (i.e., hardened) keys and may not be used to derive further child keys.

Each public transaction key 207 may have an associated index, e.g., in the range of 0 to $(2^{32}-1)$. The index may be used to navigate the node tree 200, i.e., an index may uniquely identify the location of its corresponding particular private transaction key 207. Accordingly, indices may be transmitted between devices as an efficient way to identify a public transaction key 207. In some examples, a device that receives an index may generate a corresponding public transaction key 207 from its own node tree.

In some examples, the node tree 200 may include many (e.g., hundreds, thousands, millions or billions) private transaction keys 206, e.g., a new private transaction key 206 may be generated for every transaction in which cryptocurrency is received into the customer wallet and/or every transaction in which less than all cryptocurrency in an existing transaction address is transferred. Additionally, the node tree 200 may include many (e.g., hundreds, thousands, millions or billions) public transaction keys 207, e.g., one corresponding to each private transaction key 206 in the node tree 200.

While illustrated with two hierarchical levels (L1-L2), the node tree 200 may include more hierarchical levels. In some examples, a change key level (not shown) may be positioned in between L1 and L2.

As discussed above, in order to comply with rules to avoid registration requirements for offering or selling tokens, a whitelisting functionality can be incorporated into the token contract. In order to be considered for the initial regulated token sale or offering, a potential purchaser (customer) of the token goes through a whitelisting process to ensure that they satisfy certain requirements for the purchase. For example, the whitelisting process may be implemented for token sales complying with Regulation D, and require that the potential purchaser qualify as an accredited investor as defined in Rule 501 of Regulation D. The issuer of the token verifies that the customer satisfies the criteria for purchasing a regulated token and then a public key or transaction address provided by the customer is added to the whitelist. In some examples, the whitelist is implemented on a smart contract that is different than the token contract. In such examples, the token contract includes a function call to the different smart contract implementing the whitelist. In some examples, the token contract includes a function call to multiple smart contracts implementing different whitelists, where each different whitelist verifies that the customers satisfy criteria for different regulations. For example, one whitelist may implement compliance with Regulation D while another whitelist may implement compliance with Regulation S or Regulation A.

In some examples, the potential customer provides identity data to the issuer of the token or other entity in order to be considered for the whitelist. Identity data may include a customer's name, date of birth, driver's license number and expiration date, address, phone number(s), email address(es), social security number, employment information, and/or income. In some examples, the customer also provides payment data to the asset exchange 104 or other entity in order to be considered for the whitelist. Payment data may include bank account information, credit card information, contactless payment data (e.g., Apple Pay® or Android Pay® user name and passwords), existing cryptocurrency wallet key, and/or other payment processing information (e.g., user name and password for PayPal® or WhatsApp®). The customer device 102 may transmit the identity data and the payment data associated with the customer to the issuer of the token or other entity using a secure transfer protocol, for example.

As part of the whitelisting process, or as a separate process, the issuer of the token may transmit the identity data to the identity services provider 106. The identity services provider 106 may be one or more computing devices that provide anti-money laundering (AML) and/or know-your-customer (KYC) services. AML, services may include one or more steps to ensure that a potential (or current) customer is not in violation of relevant laws and regulations designed to combat money laundering, i.e., AML services seek to ensure that a potential (or current) customer is not taking steps to obscure the source of funds that were received from illegal or unethical activities. KYC services may include one or more steps to gather, review, and monitor information related to the identity and/or financial dealings of a potential (or current) customer. In some examples, KYC services may include collecting basic identity data (e.g., name, contact information, etc.), verifying that the customer is who they say they are, and/or ensuring that the customer is not on any law enforcement watch lists. KYC services may also include performing a soft credit check (e.g., based on the customer's basic identity data), analyzing a customer's transactional behavior, and/or monitoring the customer's account for fraudulent behavior based on the customer's transaction behavior. AML and KYC may be required under various federal, state, and/or local laws.

When the AML and/or KYC procedures are complete, the identity services provider 106 may transmit a notification to the issuer of the token. The notification may indicate the success or failure of the AML and/or KYC procedures for the customer. In some examples, the identity services provider 106 may transmit a report indicating all AML and KYC checks that it performed.

When the notification indicates that all (or all necessary) AML and KYC checks were not passed, the issuer of the token may notify the customer (for example, via an application) that the AML and/or KYC failed. Alternatively, when the notification indicates that the AML and/or KYC could not be completed with the identity data, the issuer of the token may request additional information from the customer.

When the notification indicates that all (or all required) AML and KYC checks passed and all the criteria for the regulated token sale are met by the customer, the asset exchange 104 may proceed with whitelisting a transaction address provided by the customer from the customer device 102.

Since the token is a tradable asset, the initial purchaser of the token may desire to sell or exchange the token with a subsequent purchaser. As discussed above, a problem can arise when a subsequent purchaser of a regulated token with whitelisting functionality tries to withdraw the token. In particular, the withdrawal of the regulated token may be restricted to certain public keys or transaction addresses included in a smart contract implementing the whitelist. If the subsequent purchaser's public key or transaction address is not on the necessary whitelist(s), then the subsequent purchaser will not be able to withdraw the token, e.g., for fiat currency, cryptocurrency, services, etc.

Figure 3:
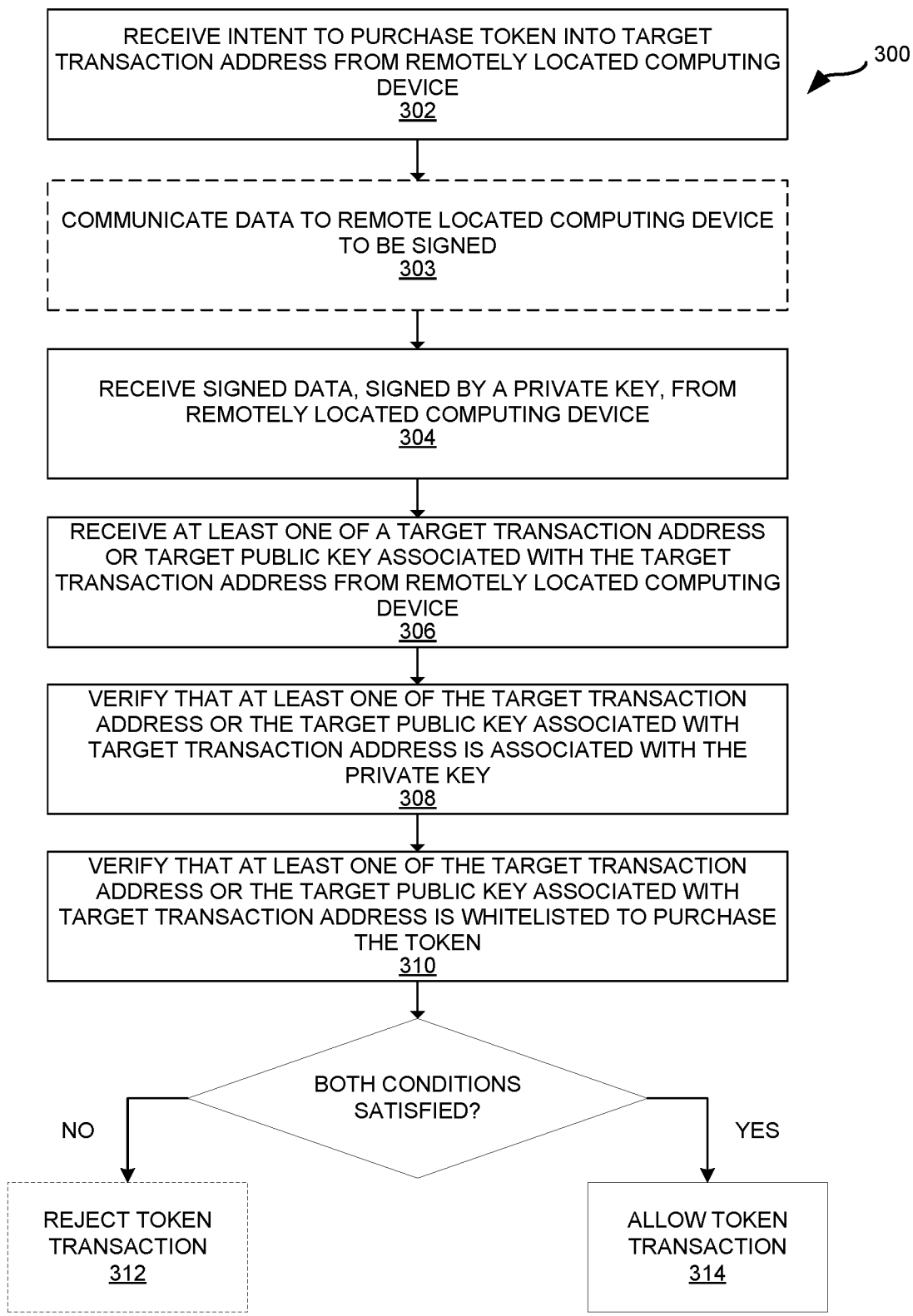
FIG. 3 is a flow diagram illustrating an example method 300 of verifying that a transaction address is on the whitelist before allowing the token transaction according to the present disclosure.

To avoid the above problems and protect the potential subsequent purchasers, the asset exchange 104 or another entity is configured to implement a verification process prior to allowing a transfer of a regulated token. FIG. 3 is a flow diagram illustrating an example method 300 of verifying that a transaction address is on the necessary whitelist(s) before allowing the token transaction. The functions, structures, and other description of elements for such examples described herein may apply to like named elements of method 300 and vice versa. The example method shown in FIG. 3 is described herein as being implemented with the features of system 100 discussed above with respect to FIGS. 1-2. It should be understood that method 300 can also be implemented in other ways.

Method 300 begins with receiving an intent to purchase a token into a target transaction address from a remotely located computing device (block 302). In some examples, the intent to purchase a token includes the remotely located computing device sending a submission of a request or some other type of communication to communicate interest in purchasing the token. In some examples, the token represents at least one of a security, a currency, a commodity, a bond, a fund, or a combination thereof. In some examples, the token is implemented using a smart contract. For example, the token is a self-regulating token implemented as an extension of Ethereum Request for Comment 20 (ERC20). In some examples, the token is self-regulating in the sense that it implements commands for compliance as a security or an asset under SEC regulations (such as, for example, Regulation A, Regulation D, or Regulation S) or regulations by other securities commissions or entities.

In some examples, method 300 optionally proceeds with communicating data to the remotely located computing device to be signed by the remotely located computing device using the private key to create the signed data in response to the intent to purchase a token into a target transaction address being received from the remotely located computing device (block 303). For example, the data sent to the remotely located computing device can include a string that is to be modified by the computing device with the private key.

In some examples, the remotely located computing device can instead be requested or instructed to provide signed data that is to be used for the verification without the particular data to be signed being sent from the asset exchange (such as, for example, asset exchange 104) or other entity that performs the verification. A common string may be generally known or obtained using other means by the remotely located computing device.

Method 300 proceeds with receiving signed data from the remotely located computing device, the signed data signed by a private key (block 304). In some examples, the signed data includes a signed string signed by the private key. As used herein, the term "signing," or its variants, refers to adding or modifying data associated with a desired transaction using a key (or a key component), e.g., signing a transaction may include using a private keys to encrypt or otherwise transform the data or string. In some examples, the signed data may be received simultaneously with the intent to purchase a regulated token. In some examples, the signed data is sent after the intent to purchase a regulated token in a subsequent communication.

Method 300 proceeds with receiving at least one of the target transaction address or a target public key associated with the target transaction address from the remotely located computing device (block 306). In some examples, only one of the target transaction address or the target public key is provided by the remotely located computing device. In some examples, both the target transaction address and the target public key associated with the target transaction address are provided by the remotely located computing device.

Method 300 proceeds with verifying that at least one of the target transaction address or the target public key associated with the target transaction address is associated with the private key (block 308). In some examples, verifying that the at least one of the target transaction address or the target public key associated with the target transaction address is associated with the private key is performed at least in part by: verifying that the at least one of the target transaction address or the target public key associated with the target transaction address is derivable from the private key used to sign the signed data. When the target public key is provided, the verification/validation can be performed using a verification algorithm that takes the string, the signature, and the target public key and returns a determination of whether the private key matches the target public key.

Method 300 proceeds with verifying that at least one of the target transaction address or the target public key associated with the target transaction address is whitelisted to purchase the token (block 310). In some examples, the smart contract for the token includes a function call to a different smart contract that implements the whitelist(s). In some examples, the smart contract for the token includes the whitelist. In some examples, the whitelist implements compliance with a single regulation or multiple regulations simultaneously. For example, the whitelist can include target transaction addresses associated with customers that comply with Regulation A, Regulation D, or Regulation S. For Regulation D compliance, the whitelist includes a list of accredited investors as defined in Rule 501 of Regulation D of the SEC regulations (see https://www.ecfr.gov/cgi-bin/retrieveECFR?gp=&SID=8edfd12967d69c024485029d96-8ee737&r=SECTION&n=17y3.0.1.1.12.0.46.176), which is incorporated by reference.

The whitelist(s) can be updated periodically to ensure that the customers associated with the public keys or transaction addresses comply with the particular rules for the whitelist. The whitelist(s) can be modified over time based on a number of factors. For example, the status of an individual or entity that qualifies as an "accredited investor" may change over time based on the value of assets owned, net worth, or income level of individual or entity. Another example is where a particular regulation that the whitelist is intended to implement has time-based restrictions. For example, Regulation S limits the sale of certain securities during the first 40 days following the commencement of an offer, so after the first 40 days, additional addresses may be whitelisted that were previously ineligible due to the location of the purchaser/seller. Accordingly, in some examples, the whitelist is modified or implemented using an oracle or other entity that operates as a data feed for providing verified information to the smart contract for the token.

Method 300 optionally proceeds with rejecting purchase of the token into the target transaction address when the at least one of the target transaction address or the target public key associated with the target transaction address is not both: (1) associated with the target transaction address associated with the private key and (2) whitelisted to purchase the token (block 312). In some examples, this includes sending a failure message to the remotely located computing device. The message can identify which requirement was the point of failure for the transaction. For example, when the customer's transaction address or public key is not whitelisted, the message can notify the customer that the target transaction address and the target public key associated with the target transaction address are not on the appropriate whitelist. In such examples, the message may also include directions regarding how to be added to the required whitelist (such as, for example, using a process similar to that described above with respect to FIG. 1). When the transaction address or the public key is not associated with the private key, the message can notify the customer that the target transaction address and the target public key associated with the target transaction address are not associated with the private key.

Method 300 proceeds with allowing purchase of the token into the target transaction address when the at least one of the target transaction address or the target public key associated with the target transaction address is both: (1) associated with the target transaction address associated with the private key and (2) whitelisted to purchase the token (block 314). If the purchase of the token is allowed, the transfer of the tokens to the target address will be executed upon receipt of the agreed upon payment.

In some examples, the token itself is configured to require at least one of the target transaction address or the target public key associated with the target transaction address to be whitelisted before allowing transaction of the token into the target transaction address. In some examples, the purchase of the token only by whitelisted target transaction addresses implements government regulations limiting who can purchase at least one of the token and at least one asset represented by the token.

In some examples, the method 300 optionally includes recording the purchase of the token into the target transaction address on a ledger (not shown). In some examples, the ledger is an Ethereum blockchain. In some examples, the ledger can be another distributed ledger or blockchain.

While the particular examples described above are discussed in the context of whitelisting for complying with securities regulations, it should be understood that the systems and methods described herein are also applicable to other scenarios where whitelisting is used for token contracts. For example, when the issuer of the tokens can limit the offering to a small group or implement commands for compliance with the any rule they choose. If the token contract implements this whitelisting functionality and is "self-regulating" as described above, the systems and methods discussed herein can be used in a similar manner to protect potential subsequent purchasers from transacting for a token they cannot withdraw.

In addition to implementing commands that restrict the transaction addresses or public keys for potential purchasers (e.g., only those on a whitelist), it also may be desirable for the issuer of the token to restrict the exchanges where the token can be traded/transferred. In particular, if the token is traded on an exchange that does not require compliance with the whitelisting functionality, the above problems for subsequent purchasers may still be experienced. Therefore, in some examples, the issuer of the token may further include commands that restrict the transfer of the token to occur only on exchanges that use the method 300 of verifying that a transaction address is on the whitelist before allowing the token transaction.

The customer device and other devices discussed above include or function with software programs, firmware or other computer readable instructions for carrying out various methods, process tasks, calculations, and control functions, used in the verification that transaction addresses are whitelisted prior to allowing a transfer of a self-regulating token.

In examples, the systems are implemented using memory and/or processors. In examples, the memory can be any device, mechanism, or populated data structure used for storing information. In examples, the memory can be or include any type of volatile memory, nonvolatile memory, and/or dynamic memory. In examples, the memory can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory. The memory may be used to store instructions for running one or more applications or modules on the processor. In examples, the memory could be used in one or more examples to house all or some of the instructions needed to execute the functionality of the any of the systems devices described herein. The processor can be any known processor, such as a general purpose processor (GPP) or special purpose (such as a field-programmable gate array (FPGA), application-specific integrated circuit (ASIC) or other integrated circuit or circuitry), or any programmable logic device.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 4:
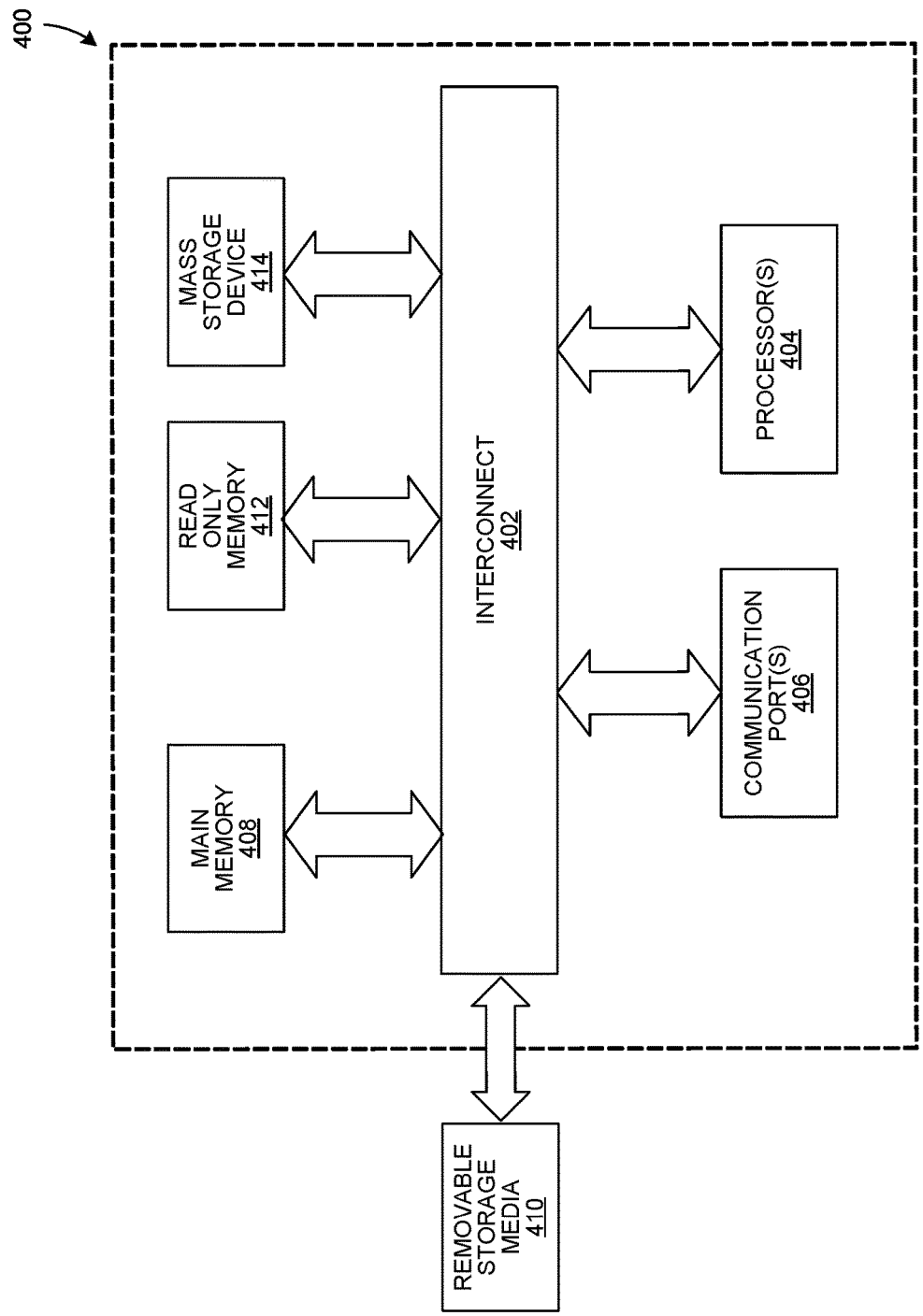
FIG. 4 is a block diagram illustrating an example computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 4 is a block diagram illustrating an example computer system 400 with which embodiments of the present disclosure may be utilized. According to the present example, the computer system 400 includes an interconnect 402, at least one processor 404, at least one communication port 406, at least one main memory 408, at least one removable storage media 410, at least one read only memory 412, and at least one mass storage device 414.

The at least one processor 404 can be any known processor. The at least one communication port 406 can be or include, for example, any of an RS-232 port for use with a modem-based dialup connection, a 10/100 Ethernet port, or a Gigabit port using copper or fiber. The nature of the at least one communication port 406 may be chosen depending on a network such as a Local Area Network (LAN), Wide Area Network (WAN), or any network to which the computer system 400 connects. The at least one main memory 408 can be Random Access Memory (RAM), or any other dynamic storage device(s) commonly known in the art. The at least one read only memory 412 can be any static storage device(s) such as Programmable Read Only Memory (PROM) chips for storing static information such as instructions for the at least one processor 404.

The at least one mass storage device 414 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 402 can be or include one or more buses, bridges, controllers, adapters, and/or point-to-point connections. Interconnect 402 communicatively couples the at least one processor 404 with the other memory, storage, and communication blocks. Interconnect 402 can be a PCI/PCI-X or SCSI based system bus depending on the storage devices used. The at least one removable storage media 410 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

Figure 5:
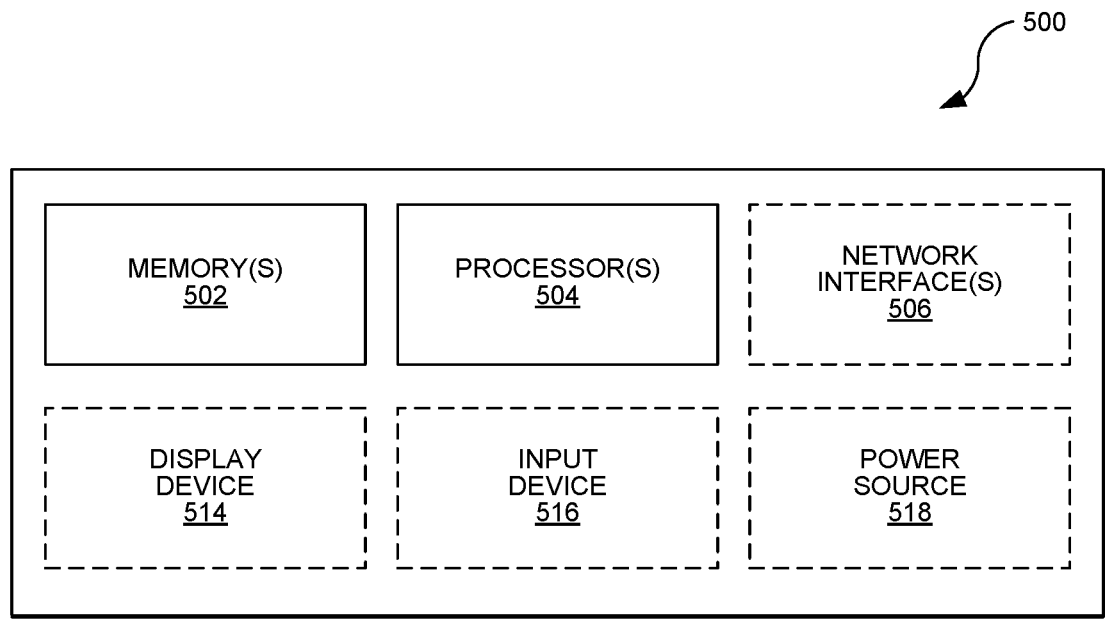
FIG. 5 is a block diagram illustrating another example computing device.

FIG. 5 is a block diagram illustrating another example computing device 500. The example computing device 500 may be used to implement any of the customer device 102, the asset exchange 104, the identity services provider 106, and/or the second asset exchange 108. The computing device 500 includes at least one memory 502, at least one processor 504, optional at least one network interface 506, optional display device 508, optional input device 510, and optional power source 512.

In examples, the at least one memory 502 can be any device, mechanism, or populated data structure used for storing information. In examples, the at least one memory 502 can be or include any type of volatile memory, non-volatile memory, and/or dynamic memory. In examples, the at least one memory 502 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 502 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 502. The at least one memory 502 may be used to store instructions for running one or more applications or modules on the at least one processor 504. In examples, the at least one memory 502 could be used in one or more examples to house all or some of the instructions needed to execute the functionality discussed herein, e.g., in FIG. 3.

The at least one processor 504 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality disclosed herein (e.g., in FIG. 3) may be implemented by the at least one processor 504 and the at least one memory 502.

In examples, the at least one optional network interface 506 includes or is coupled to at least one optional antenna for communication with a network (such as one of the at least one networks 112 of system 100). In examples, the at least one optional network interface 506 includes at least one of an Ethernet interface, a cellular radio access technology (RAT) radio, a Wi-Fi radio, a Bluetooth radio, or a near field communication (NFC) radio. In examples, the at least one optional network interface 506 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 506 includes a Wi-Fi (IEEE 802.11) radio configured to communicate with a wireless local area network that communicates with the remote server, rather than a wide area network. In examples, the at least one optional network interface 506 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 508 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 510 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 508 is combined with the optional at least one input device 510 into a human machine interface (HMI) for user interaction with the customer device 102, the asset exchange 104, and/or the optional second asset exchange 108. In examples, at least one optional power source 512 is used to provide power to the various components of the computing device 500.

Terminology

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for verifying that a transaction address is on the whitelist before allowing the token transaction. While detailed descriptions of one or more embodiments of the disclosure have been given above, various alternatives, modifications, and equivalents will be apparent to those skilled in the art without varying from the spirit of the disclosure. In some examples, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes system comprising: at least one processor; at least one memory communicatively coupled to the at least one processor; at least one network interface communicatively coupled to the at least one processor; wherein the at least one processor is configured to: receive an intent to purchase a token into a target transaction address from a remotely located computing device; receive signed data from the remotely located computing device, the signed data signed by a private key; receive at least one of the target transaction address or a target public key associated with the target transaction address from the remotely located computing device; verify that the at least one of the target transaction address or the target public key associated with the target transaction address is associated with the private key; verify that the at least one of the target transaction address or the target public key associated with the target transaction address is whitelisted to purchase the token; and allow purchase of the token into the target transaction address when the at least one of the target transaction address or the target public key associated with the target transaction address is both: (1) associated with the private key and (2) whitelisted to purchase the token.

Example 2 includes the system of Example 1, wherein the token is configured to require at least one of the target transaction address or the target public key associated with the target transaction address to be whitelisted before allowing transaction of the token into the target transaction address.

Example 3 includes the system of any of Examples 1-2, wherein the signed data includes a signed string signed by the private key.

Example 4 includes the system of any of Examples 1-3, wherein the at least one processor is configured to verify that the at least one of the target transaction address or the target public key associated with the target transaction address is associated with the private key at least in part by being configured to: verify that the at least one of the target transaction address or the target public key associated with the target transaction address is derivable from the private key used to sign the signed data.

Example 5 includes the system of any of Examples 1-4, wherein the at least one processor is configured to communicate data to the remotely located computing device to be signed by the remotely located computing device using the private key to create the signed data in response to the intent to purchase a token into a target transaction address being received from the remotely located computing device.

Example 6 includes the system of any of Examples 1-5, wherein the purchase of the token only by whitelisted transaction addresses implements government regulations limiting who can purchase at least one of the token and at least one asset represented by the token.

Example 7 includes the system of any of Examples 1-6, wherein whitelisted transaction addressees are associated with individuals that comply with the government regulations limiting who can purchase at least one of the token and the at least one asset represented by the token.

Example 8 includes the system of any of Examples 1-7, wherein the token represents at least one of a security, a currency, a commodity, a bond, a fund, or a combination thereof.

Example 9 includes the system of any of Examples 1-8, wherein the token is implemented using a smart contract.

Example 10 includes the system of any of Examples 1-9, wherein the whitelist is implemented using a smart contract.

Example 11 includes the system of any of Examples 1-10, wherein the token is a self-regulating token implemented as an extension of Ethereum Request for Comment (ERC) 20.

Example 12 includes the system of any of Examples 1-11, wherein purchase of the token into the target transaction address is recorded on a ledger.

Example 13 includes the system of any of Examples 1-12, wherein purchase of the token into the target transaction address is recorded on an Ethereum blockchain.

Example 14 includes the system of any of Examples 1-13, wherein the at least one processor is further configured to reject purchase of the token into the target transaction address when the at least one of the target transaction address or the target public key associated with the target transaction address is not both: (1) associated with the target transaction address associated with the private key and (2) whitelisted to purchase the token.

Example 15 includes a method for verifying a target transaction address is whitelisted before allowing transfer of a token to the target transaction address, the method comprising: receiving an intent to purchase a token into a target transaction address from a remotely located computing device; receiving signed data from the remotely located computing device, the signed data signed by a private key; receiving at least one of the target transaction address or a target public key associated with the target transaction address from the remotely located computing device; verifying that the at least one of the target transaction address or the target public key associated with the target transaction address is associated with the private key; verifying that the at least one of the target transaction address or the target public key associated with the target transaction address is whitelisted to purchase the token; and allowing purchase of the token into the target transaction address when the at least one of the target transaction address or the target public key associated with the target transaction address is both: (1) associated with the target transaction address associated with the private key and (2) whitelisted to purchase the token.

Example 16 includes the method of Example 15, further comprising rejecting purchase of the token into the target transaction address when the at least one of the target transaction address or the target public key associated with the target transaction address is not both: (1) associated with the target transaction address associated with the private key and (2) whitelisted to purchase the token.

Example 17 includes the method of any of Examples 15-16, wherein the token is configured to require at least one of the target transaction address or the target public key associated with the target transaction address to be whitelisted before allowing transaction of the token into the target transaction address.

Example 18 includes method of any of Examples 15-17, wherein the signed data includes a signed string signed by the private key.

Example 19 includes method of any of Examples 15-18, wherein verifying that the at least one of the target transaction address or the target public key associated with the target transaction address is associated with the private key at least in part by: verifying that the at least one of the target transaction address or the target public key associated with the target transaction address is derivable from the private key used to sign the signed data.

Example 20 includes method of any of Examples 15-19, further comprising: communicating data to the remotely located computing device to be signed by the remotely located computing device using the private key to create the signed data in response to the intent to purchase a token into a target transaction address being received from the remotely located computing device.

Example 21 includes method of any of Examples 15-20, wherein the purchase of the token only by whitelisted target transaction addresses implements government regulations limiting who can purchase at least one of the token and at least one asset represented by the token.

Example 22 includes method of any of Examples 15-21, wherein whitelisted transaction addressees are associated with individuals that comply with the government regulations limiting who can purchase at least one of the token and the at least one asset represented by the token.

Example 23 includes method of any of Examples 15-22, wherein the token represents at least one of a security, a currency, a commodity, a bond, a fund, or a combination thereof.

Example 24 includes method of any of Examples 15-23, wherein the token is implemented using a smart contract.

Example 25 includes method of any of Examples 15-24, wherein the whitelist is implemented using a smart contract.

Example 26 includes method of any of Examples 15-25, wherein the token is a self-regulating token implemented as an extension of Ethereum Request for Comment (ERC) 20.

Example 27 includes method of any of Examples 15-26, further comprising: recording the purchase of the token into the target transaction address on a ledger.

Example 28 includes method of any of Examples 15-27, further comprising: recording the purchase of the token into the target transaction address on an Ethereum blockchain.

What is claimed is:

1. A system comprising:
a computer system; and
a remotely located computing device connected to at least one network and configured to cryptographically sign data by cryptographically transforming the data using a private key to create cryptographically signed data, the data communicated by the computer system, the private key having: (1) a corresponding public key derived from the private key and (2) a corresponding transaction address associated with the corresponding public key and derived from at least one of the private key and the corresponding public key;
the computer system comprising:
 at least one processor;
 at least one memory communicatively coupled to the at least one processor;
 at least one network interface communicatively coupled to the at least one processor; and
 wherein the at least one processor is configured to:
  receive a request to cryptographically transfer a cryptographic token into a target transaction address from the remotely located computing device via the at least one network using the at least one network interface;
  communicate the data to the remotely located computing device via the at least one network using the at least one network interface in response to the request to cryptographically transfer the cryptographic token into the target transaction address being received from the remotely located computing device via the at least one network using the at least one network interface;
  comply with a first smart contract to restrict withdrawal of the cryptographic token to only: (1) whitelisted transaction addresses identified in a smart contract-implemented whitelist or (2) whitelisted public keys that are associated with the whitelisted transaction addresses identified in the smart contract-implemented whitelist;
  receive the cryptographically signed data from the remotely located computing device via the at least one network using the at least one network interface;
  receive at least one of the target transaction address or a target public key associated with the target transaction address from the remotely located computing device via the at least one network using the at least one network interface;
  cryptographically verify that the at least one of the target transaction address or the target public key associated with the target transaction address corresponds to the private key used to cryptographically sign the cryptographically signed data by: receiving both (1) the cryptographically signed data cryptographically signed by the private key and (2) the at least one of the target transaction address or the target public key associated with the target transaction address into a processor-implemented cryptographic verification function; and
  outputting a determination from the processor-implemented cryptographic verification function that at least one of:
   (1) the target transaction address is cryptographically derivable from the private key used to cryptographically sign the cryptographically signed data such that the target transaction address is the corresponding transaction address associated with the corresponding public key and derived from at least one of the private key and the corresponding public key; or
   (2) the target public key associated with the target transaction address is cryptographically derivable from the private key used to cryptographically sign the cryptographically signed data such that the target public key is the corresponding public key derived from the private key;
  only verify that the at least one of the target transaction address or the target public key associated with the target transaction address is whitelisted to receive cryptographic transfer of the cryptographic token after the target transaction address or the target public key associated with the target transaction address is identified in the smart contract-implemented whitelist;
  only communicate the cryptographic transfer, via the at least one network and using the at least one network interface, to a blockchain to cryptographically transfer and record the cryptographic transfer of the cryptographic token into the target transaction address on the blockchain after:
   (1) cryptographically verifying that the at least one of the target transaction address or the target public key associated with the target transaction address corresponds to the private key used to cryptographically sign the cryptographically signed data; and
   (2) verifying that the at least one of the target transaction address or the target public key associated with the target transaction address is whitelisted to receive the cryptographic transfer of the cryptographic token after the target transaction address or the target public key associated with the target transaction address is identified in the smart contract-implemented whitelist; and
  reject (1) the cryptographic transfer of the cryptographic token into the target transaction address and (2) communication of the cryptographic transfer, via the at least one network and using the at least one network interface, to the blockchain when it is not both:
   (1) cryptographically verified that the at least one of the target transaction address or the target public key associated with the target transaction address is cryptographically derivable from the private key used to cryptographically sign the cryptographically signed data; and
   (2) verified that the at least one of the target transaction address or the target public key associated with the target transaction address is whitelisted to receive the cryptographic transfer of the cryptographic token based on the smart contract-implemented whitelist.

2. The system of claim 1, further comprising:

the cryptographically signed data including a cryptographically signed string previously cryptographically signed by the private key at the remotely located computing device by cryptographically transforming the cryptographically signed string using the private key.

3. The system of claim 1, further comprising:

the cryptographic token representing at least one of a security, a currency, a commodity, a bond, a fund, or a combination thereof.

4. The system of claim 1, further comprising:

the cryptographic token is a self-regulating cryptographic token implemented as an extension of the Ethereum Request for Comment (ERC) 20 cryptographic token standard.

5. The system of claim 1, further comprising:

the blockchain on which recordation of the cryptographic transfer of the cryptographic token into the target transaction address is recorded is implemented by a series of nodes implementing the Ethereum protocol.

6. The system of claim 1, further comprising:

the private key being at least 256 bits long; and the target public key being at least 256 bits long.

7. The system of claim 1, further comprising:

the target public key derived from the private key; and the target transaction address derived from at least one of the private key or the target public key.

* * * * *